United States Patent
Minagawa et al.

(10) Patent No.: US 9,075,328 B2
(45) Date of Patent: Jul. 7, 2015

(54) HEAT TREATMENT APPARATUS AND METHOD FOR MANUFACTURING TONER

(75) Inventors: Hironori Minagawa, Moriya (JP); Yuichi Mizo, Toride (JP); Takeshi Ohtsu, Toride (JP); Junichi Hagiwara, Tsuchiura (JP); Yasushi Tamura, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 13/984,243

(22) PCT Filed: Jan. 31, 2012

(86) PCT No.: PCT/JP2012/052578
§ 371 (c)(1),
(2), (4) Date: Aug. 7, 2013

(87) PCT Pub. No.: WO2012/114854
PCT Pub. Date: Aug. 30, 2012

(65) Prior Publication Data
US 2013/0323638 A1    Dec. 5, 2013

(30) Foreign Application Priority Data

Feb. 21, 2011    (JP) .................................. 2011-034251

(51) Int. Cl.
*F26B 21/00*    (2006.01)
*G03G 9/08*    (2006.01)
(Continued)

(52) U.S. Cl.
CPC ............ *G03G 9/0815* (2013.01); *G03G 9/0804* (2013.01); *G03G 9/0806* (2013.01);
(Continued)

(58) Field of Classification Search
CPC ................ F26B 3/00; F26B 5/00; F26B 9/00; F26B 17/00; F26B 17/10; F26B 21/00; G03G 9/00; G03G 9/08; G03G 21/00

USPC ......... 34/371, 380, 381, 582, 597; 430/110.3, 430/137.1
See application file for complete search history.

(56) References Cited

U.S. PATENT DOCUMENTS 4,057,908 A * 11/1977 Mirliss et al. ................... 34/360
5,026,861 A    6/1991 Flynn et al.
(Continued)

FOREIGN PATENT DOCUMENTS

| CN | 1443599 A | 9/2003 |
| CN | 1755530 A | 4/2006 |

(Continued)

OTHER PUBLICATIONS

Chinese Office Action dated Jun. 10, 2014 in Chinese Application No. 201280009889.9.
(Continued)

*Primary Examiner* — Steven M Gravini
(74) *Attorney, Agent, or Firm* — Fitzpatrick, Cella, Harper and Scinto

(57) ABSTRACT

An object of the present invention is to suppress the increase of coarse particles due to the fusion of powder particles and reduce a ratio of particles that have been excessively spheroidized, when the powder particles are heat-treated. A heat treatment apparatus including a raw-material supply unit, a hot-air supply unit for heat-treating a raw material and a discharge portion for discharging the heat-treated powder particles, and supplying hot air toward a raw material to be supplied from the raw-material supply unit, wherein the hot-air supply unit has a first nozzle and a second nozzle which spread in the radial direction downward from an upstream side in a hot-air supply direction, the second nozzle is arranged in the inside of the first nozzle, the hot air passes through a space between the first nozzle and the second nozzle, and an air-flow adjustment unit section for rotating the supplied hot air spirally along an inner wall face of the apparatus is provided in an outlet portion of the hot-air supply unit.

7 Claims, 8 Drawing Sheets

(51) Int. Cl.
*F26B 17/12* (2006.01)
*F26B 17/16* (2006.01)
*B01J 19/26* (2006.01)
*F26B 3/10* (2006.01)

(52) U.S. Cl.
CPC .............. *G03G9/0819* (2013.01); *F26B 17/12* (2013.01); *F26B 17/16* (2013.01); *G03G 9/0827* (2013.01); *B01J 19/26* (2013.01); *B01J 2219/00119* (2013.01); *F26B 3/10* (2013.01)

(56) References Cited

U.S. PATENT DOCUMENTS

| | | | |
|---|---|---|---|
| 5,231,937 A * | 8/1993 | Kobayashi et al. | 110/262 |
| 6,852,463 B2 | 2/2005 | Teshima | |
| 7,536,132 B2 | 5/2009 | Minagawa | |
| 7,560,218 B2 | 7/2009 | Omatsu et al. | |
| 8,236,473 B2 | 8/2012 | Kawase et al. | |
| 8,288,069 B2 | 10/2012 | Fujikawa et al. | |
| 8,455,167 B2 | 6/2013 | Shiotari et al. | |
| 2002/0168466 A1 * | 11/2002 | Tapphorn et al. | 427/180 |
| 2004/0202884 A1 * | 10/2004 | Buresch et al. | 428/556 |
| 2005/0164115 A1 | 7/2005 | Tamura et al. | |
| 2009/0258310 A1 | 10/2009 | Matsumoto et al. | |
| 2009/0274985 A1 * | 11/2009 | McKnight et al. | 431/36 |
| 2013/0323638 A1 * | 12/2013 | Minagawa et al. | 430/137.1 |
| 2014/0096409 A1 * | 4/2014 | Ohtsu et al. | 34/371 |
| 2014/0101966 A1 * | 4/2014 | Minagawa et al. | 34/360 |
| 2014/0120468 A1 * | 5/2014 | Mizo et al. | 430/137.1 |

FOREIGN PATENT DOCUMENTS

| | | |
|---|---|---|
| CN | 101554570 A | 10/2009 |
| CN | 101727028 A | 6/2010 |
| JP | 59-127662 A | 7/1984 |
| JP | 62-133466 A | 6/1987 |
| JP | 3-52858 A | 3/1991 |
| JP | 4-126534 A | 4/1992 |
| JP | 7-271090 A | 10/1995 |
| JP | 2004-191569 A | 7/2004 |
| JP | 2004-276016 A | 10/2004 |
| JP | 2008-129522 A | 6/2008 |
| JP | 2010-117611 A | 5/2010 |
| JP | 2011-128488 A | 6/2011 |
| WO | 2011/074060 A1 | 6/2011 |

OTHER PUBLICATIONS

Ohtsu, et al., U.S. Appl. No. 14/123,961, 371(c) filed Dec. 4, 2013.
Mizo, et al., U.S. Appl. No. 14/123,960, 371(c) filed Dec. 4, 2013.
Minagawa, et al., U.S. Appl. No. 14/125,573, 371(c) filed Dec. 11, 2013.
Takenaka, et al., U.S. Appl. No. 14/125,572, 371(c) filed Dec. 11, 2013.
PCT International Search Report and Written Opinion of the International Searching Authority, International Application No. JP2012/052578, Mailing Date Apr. 24, 2012.

* cited by examiner

HEAT TREATMENT APPARATUS AND METHOD FOR MANUFACTURING TONER

TECHNICAL FIELD

The present invention relates to a heat treatment apparatus for powder particles, and a method for manufacturing a toner.

BACKGROUND ART

In order to enhance the developing properties and the like of a toner, the surface of toner particles is modified by heat treatment. PTL 1 describes a method for spraying and dispersing powder particles into hot air with compressed air, thereby modifying the surface, and spheroidizing the particles. PTL 2 describes a method for adding an additive such as silica to the powder particles, then subjecting the powder particles to heat treatment to fix the additive onto the powder particles, and thereby removing the liberated additive.

However, in the method of modifying the surface by using heat, when more heat than is necessary is applied to the toner, the toners fuse with each other and occasionally produce coarse particles. In order to efficiently and stably manufacture surface-modified particles for the toner, which do not thus contain the coarse particle, contain less fine powder, and have a sharp particle size distribution, there is a room for improvement in points of an apparatus and method for manufacturing the toner.

In addition, in order that the toner acquires adequate developing properties and the like, the toner can have an average degree of circularity of 0.960 or more.

However, when an average degree of circularity of the toner is high, excessively spheroidized toner particles generally increase in the toner, and thereby, cleanability tends to be lowered. This is because the excessively spheroidized toner particles easily pass through a cleaning blade. Techniques for preventing the toner particles from passing through the cleaning blade include increasing the contact pressure of the cleaning blade, but the technique has a limit because of causing a harmful effect such as the increase of the running torque of a drum and the wear of the cleaning blade. Incidentally, it is proved from a recent investigation that when the frequency of the particles with the degree of circularity of 0.990 or more in the distribution of the degree of circularity of the toner exceeds 20%, a cleaning failure tends to occur easily.

PTL 1 proposes a method of subjecting a so-called pulverized toner to heat treatment, and thereby adequately spheroidizing the toner. However, when the toner particles are heat-treated by using the technique described in PTL 1, the toner particles are nonuniformly heat-treated, and accordingly the heat-treated toner particles and untreated toner particles result in being mixed. On the other hand, when all of the particles are heat-treated for a long period of time so as to be uniformly heat-treated, the ratio of the excessively spheroidized toner particles increases in the toner, and the cleanability of the toner is lowered.

PTL 3 describes a method of heat-treating toner particles while making the air flow in the apparatus uniform to some extent, as a technique of uniformly heat-treating the toner particles.

However, in the method described in PTL 3, the portion of charging the toner is provided in the charge portion of hot air, and accordingly the toner is instantly heat-treated in a narrow range. In this case, the toner is not sufficiently dispersed, and the increase of the coarse particles due to the fusion of the toners is concerned. In addition, when the treatment amount is increased, the heat treatment efficiency of the toner is rapidly lowered, because the toner concentration with respect to the hot air increases. Accordingly, the heat-treated toner and the untreated toner result in being mixed.

PTL 4 describes a structure in which the charge position of the hot air and the charge position of the toner are reversed, in contrast to the structure described in PTL 3. However, in the structure described in PTL 4, the toner is injected toward the hot air and also toward the center part of the apparatus, and accordingly it is concerned that the heat-treated toners collide with each other before being solidified and the coalescing particles increase.

CITATION LIST

Patent Literature

PTL 1: Japanese Patent Application Laid-Open No. 2004-276016
PTL 2: Japanese Patent Application Laid-Open No. H07-271090
PTL 3: Japanese Patent Publication No. H03-52858
PTL 4: Japanese Patent Application Laid-Open No. 2004-191569

SUMMARY OF INVENTION

Technical Problem

An object of the present invention is to solve the above described problems and provide a heat treatment apparatus which suppresses the coarsening of particles and can provide particles that contain less fine powder and have a sharp particle size distribution, even when the treatment amount of powder particles has been increased; and to provide a method for manufacturing a toner, which enables the same. Another object of the present invention is to provide a heat treatment apparatus which gives a sharp distribution (small standard deviation) of a degree of circularity to the particles to be obtained, and can suppress the ratio of particles that have been excessively spheroidized; and to provide a method for manufacturing the toner, which enables the same.

Solution to Problem

The present invention relates to a heat treatment apparatus for heat-treating powder particles containing a thermoplastic binder resin, wherein the heat treatment apparatus includes: a raw-material supply unit for supplying the powder particles into the apparatus; a hot-air supply unit for heat-treating the supplied powder particles; and a discharge portion for discharging the heat-treated powder particles, the discharge portion being positioned in a downstream side of the raw-material supply unit and the hot-air supply unit, wherein the raw-material supply unit is circularly provided so as to surround the hot-air supply unit at such a position as to be adjacent to an outer peripheral face of the hot-air supply unit or be separated from the outer peripheral face in the horizontal direction, hot air is supplied toward the powder particles which are supplied from the raw-material supply unit, from an outlet of the hot-air supply unit, the hot-air supply unit has a first nozzle and a second nozzle which spread in the radial direction to the downstream side from an upstream side in a hot-air supply direction, the second nozzle is arranged in the inside of the first nozzle, the hot air passes through a space between the inside of the first nozzle and the outside of the second nozzle, and an air-flow adjustment unit for rotating the supplied hot air spirally along an inner wall face of the apparatus is provided in an outlet portion of the hot-air supply unit.

Advantageous Effects of Invention

The present invention can provide a heat treatment apparatus which suppresses the coarsening of particles and can provide particles that have less fine powder and a sharp particle size distribution, even when the treatment amount of powder particles has been increased; and a method for manufacturing a toner, which enables the same. The present invention can also provide a heat treatment apparatus which gives a sharp distribution (small standard deviation) of a degree of circularity to the particles to be obtained, and can suppress the ratio of particles that have been excessively spheroidized; and a method for manufacturing a toner, which enables the same.

Further features of the present invention will become apparent from the following description of exemplary embodiments with reference to the attached drawings.

DESCRIPTION OF EMBODIMENTS

Figure 1A:
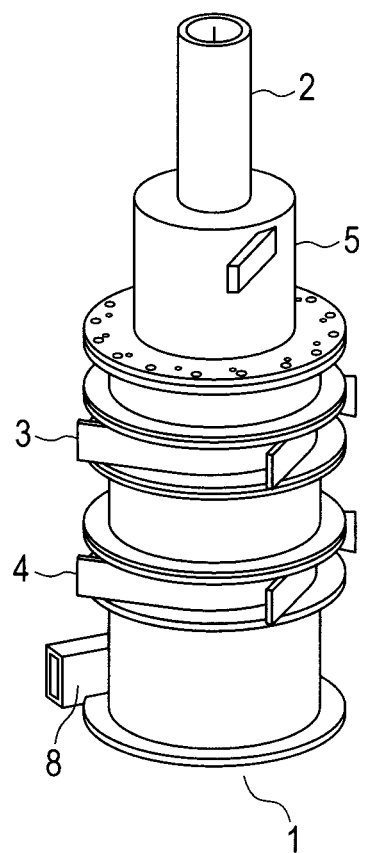
FIGS. 1A, 1B and 1C are schematic views of a heat treatment apparatus used in Exemplary Embodiment 1.
Figure 1B:
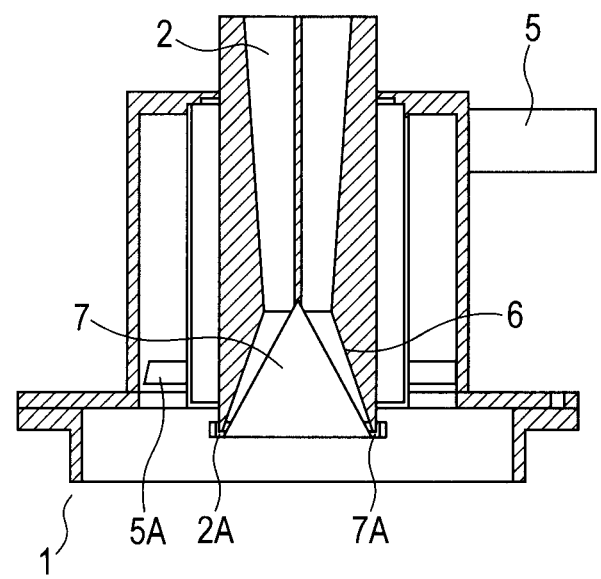
Figure 1C:
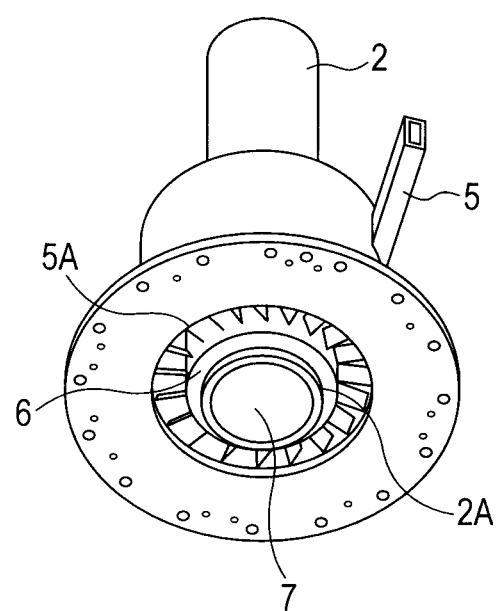

An outline of the heat treatment apparatus according to the present invention will be described below with reference to the drawings. FIGS. 1A to 1C are views illustrating one example of a heat treatment apparatus according to the present invention. Incidentally, in the present specification, the coarse particles mean a particle group having approximately twice or more of a weight average particle diameter (D4) of the toner, fine particles mean a particle group having approximately a half or less of the weight average particle diameter (D4) of the toner, and particles with sizes of 2.0 μm or less mean a particle group with a particle diameter of 2.0 μm or less, which is measured by a flow type particle-image analyzer "FPIA-3000-type" (made by SYSMEX CORPORATION).

The heat treatment apparatus according to the present invention is an apparatus for heat-treating a powder particle containing a thermoplastic binder resin. Examples of the powder particle include a toner particle having the binder resin and a colorant. Incidentally, in the present specification, the toner particle to be supplied to the heat treatment apparatus as the powder particle is also referred to as a toner particle to be treated.

The powder particle which has been supplied to a raw-material supply unit (5) is accelerated by a compressed gas which is supplied from a compressed-gas supply unit (not shown), passes through an adjustment portion provided in the outlet portion of the raw-material supply unit (5), and is injected into the apparatus. The adjustment portion has a louver structure, and is structured so that the powder particle rotates spirally along the inner wall face of the apparatus when the powder particle passes through the apparatus. A hot-air supply unit (2) is provided in the axial center part of the apparatus, and the raw-material supply unit (5) is circularly provided so as to surround the hot-air supply unit (2) at such a position as to be adjacent to the outer peripheral face of the hot-air supply unit (2) or be separated from the outer peripheral face in the horizontal direction. Hot air is passed through a space formed by a first nozzle (6) and a second nozzle (7) arranged in the inner side of the first nozzle, which spread in the radial direction to the downstream side from the upstream side in the hot-air supply direction, and is injected toward the raw material in the outer position with respect to the radial direction, in the apparatus. In the outlet portion of the hot-air supply unit, an air-flow adjustment unit (2A) is provided between the inside of the first nozzle (6) and the outside of the second nozzle (7). Thereby, the air-flow adjustment unit (2A) is structured so that the hot air flows while rotating spirally along the inner wall face of the apparatus. The structure of the air-flow adjustment unit (2A) can be appropriately selected from a louver structure, a slit structure or a structure having a lib (7B) provided in the second nozzle, and is not limited in particular, as long as the air-flow adjustment unit has a function of spirally rotating the hot air along the inner wall face of the apparatus. The air-flow adjustment unit (2A) is structured so that the rotation direction of the hot air is the same as that of the flow of the raw material. Furthermore, a return portion (7A) is provided in the lower end of the second nozzle, and is structured so that the hot air more easily spreads in a circumferential direction. In the heat treatment apparatus according to the present invention, the hot air spreads in a circumferential direction when being injected into the apparatus from the outlet portion of the hot-air supply unit, by passing through a space between the inside of the first nozzle (6) and the outside of the second nozzle (7). Thereby, the powder particles can be more efficiently heat-treated in a more nearly uniform state.

The apparatus can be provided with one or more cold-air supply units, for the purpose of controlling the temperature in the apparatus and controlling the surface state of the powder particles. The heat treatment apparatus illustrated in FIGS. 1A to 1C is provided with cold-air supply units (3 and 4) for cooling the heat-treated powder particles and preventing the fusion and the melt-adhesion of the powder particles due to a temperature rise in the apparatus, in the downstream side of the hot-air supply unit (2) and the raw-material supply unit (5). The cold-air supply units (3 and 4) supply cold air in an approximately horizontal direction along the inner peripheral face of the apparatus, from the outer circumferential part of the apparatus.

Furthermore, a cooling jacket is provided in the inner circumferential part of the raw-material supply unit (5), the outer circumferential part of the apparatus, the outer circumferential part of the hot-air supply unit (2) and the outer circumferential part of a collection unit (8), so as to prevent the powder particles from melt-adhesion to the inner part of the apparatus due to the heat treatment. In addition, a coolant (which can be antifreeze such as ethylene glycol) can be introduced into the cooling jacket.

The hot air to be supplied into the apparatus can have a temperature C (° C.) in a range of 100≤C≤450, in the outlet portion of the hot-air supply unit (2). If the temperature C is within the above described range, the powder particles can be almost uniformly heat-treated, and the fusion of the powder particles can be suppressed.

A quantitative supply device such as a quantitative supply machine FS type (made by FUNKEN POWTECHS, INC.) and Fine Tron FT (made by Hosokawa Micron Corporation) may also be used so as to quantitatively supply the powder particles into the raw-material supply unit (5).

The cooled powder particles are discharged through the discharge portion (8), and are then collected.

A blower (not shown) is provided in the downstream side of the discharge portion (8), and the toner particles are sucked and transported by the blower.

The discharge portion is provided in at least one site of the lowermost part of the apparatus, and can be structured so as to be approximately horizontal, in the outer circumferential part of the inner wall of the apparatus. The direction of the connected discharge portion can be set at such a direction that the rotation of the flow of the powder particles reaching to the discharge portion from the upstream part of the apparatus is maintained.

In the present apparatus, a relation between the total amount QIN of the flow rates of the compressed gas, the hot air and the cooled air which are supplied into the apparatus and an air quantity QOUT of the air sucked by the blower can be controlled so as to satisfy a relation of QIN≤QOUT. If the QIN and the QOUT satisfy the above described relation, the pressure in the apparatus becomes a negative pressure, which prevents the powder particles from staying in the apparatus, and the fusion of the particles and the melt-adhesion of the particles to the inner part of the apparatus are suppressed.

A cylindrical pole (not shown) can also be provided in the axial center part in the apparatus. When the above described pole is provided, a jacket can be provided on the pole so as to prevent the heat-treated raw material from being melt-adhesive bonded to the pole.

A process in which the powder particles are spheroidized in the heat treatment apparatus of the present invention will be described below.

The hot air supplied from the hot-air supply unit (2) is supplied into the apparatus by the air-flow adjustment unit (2A) in the outlet portion of the hot-air supply unit while spirally rotating along the inner wall face of the apparatus. The powder particles which have been supplied from the raw-material supply unit (5) ride on the hot air which have been supplied from the hot-air supply unit (2), and accordingly a ratio of the collision among the powder particles is alleviated, and the fusion of the powder particles is suppressed. In addition, the powder particles ride on the hot air supplied from the hot-air supply unit (2), and accordingly the powder particles having a large particle diameter pass through a flow path having a large radius of rotation in the outer circumference side of the flow. On the other hand, the powder particles having a small particle diameter result in passing through a flow path having a small radius of rotation in the inner circumference side of the flow. Accordingly, the powder particles having the large particle diameter result in being heated for a long period of time, and on the contrary, the powder particles having the small particle diameter result in being heated for a short period of time. Accordingly, an appropriate heat quantity can be applied to the powder particles according to the particle diameter of the powder particles.

In addition, a process will be described below in which the powder particles are spheroidized, when the heat treatment apparatus further has an adjustment unit (5A) provided in the outlet portion of the raw-material supply unit (5), the powder particles are transported with a compressed gas in the raw-material supply unit (5), and the flow of the powder particles and the rotation direction of the hot air are controlled to be the same direction.

Because the powder particles supplied into the raw-material supply unit (5) are transported by the compressed gas, the powder particles have a fast flow speed in some degree. The powder particles are charged while being dispersed into the apparatus so as to spirally rotate along the wall face, in a state of having continuous momentum due to the adjustment unit (5A) in the outlet portion of the raw-material supply unit (5). The hot air supplied from the hot-air supply unit (2) is supplied into the apparatus while spirally rotating due to the air-flow adjustment unit (2A), in the outlet portion of the hot-air supply unit (2). Because the flow of the powder particles and the rotation direction of the hot air have the same direction, the turbulent flow in the apparatus is suppressed. The powder particles ride on the hot air supplied from the hot-air supply unit (2) in the state, accordingly a ratio of the collision among the powder particles is alleviated, and the fusion of the powder particles is suppressed. In addition, the powder particles are classified so that the large particles flow in the outer circumference side of the flow, and the small particles flow in the inner circumference side of the flow, according to the difference of the particle diameter, when being injected into the apparatus by the raw-material supply unit. The powder particles ride on the hot air supplied from the hot-air supply unit (2) in the state, and accordingly the powder particles having the large particle diameter result in passing through a flow path having the large radius of rotation in the outer circumference side of the flow, and the powder particles having the small particle diameter result in passing through a flow path having the small radius of rotation in the inner circumference side of the flow. Accordingly, the powder particles having the large particle diameter result in being heated for a long period of time, and on the contrary, the powder particles having the small particle diameter result in being heated for a short period of time, which accordingly enables an appropriate heat quantity to be applied to the powder particles according to the particle diameter.

The heat treatment apparatus which has been conventionally proposed has had a structure in which an injection port of the powder particles is provided in the hot air, and the powder particles are dispersed in the hot air by the compressed air. However, in this structure, an appropriate heat quantity according to the particle diameter of the powder particles cannot be added to the powder particles, and the degree of circularity tends to vary according to the particle diameters of the powder particles. This fact means that a ratio of untreated powder particles mixed in the heat-treated powder particles increases. On the other hand, if a more heat quantity is applied to the powder particles so as to lower the ratio of the mixed untreated powder particles, a ratio of excessively spheroidized powder particles increases, and/or the fusion of the powder particles occurs.

Figure 5:
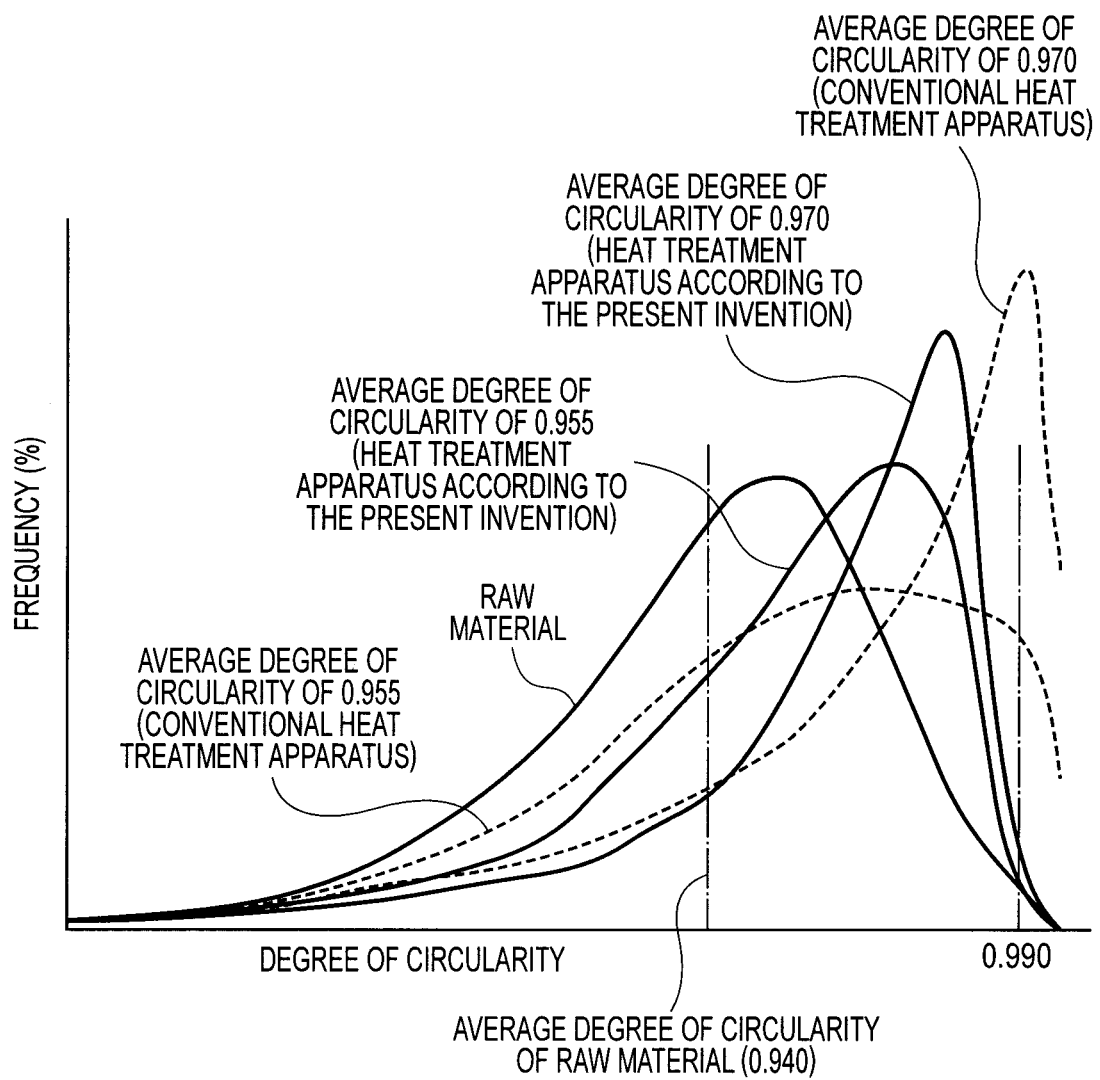
FIG. 5 is a view illustrating a change of a distribution of a degree of circularity due to heat treatment.

FIG. 5 illustrates a distribution of a degree of circularity of powder particles obtained in the case in which a conventional heat treatment apparatus has been used and in the case in which the heat treatment apparatus according to the present invention has been used. In FIG. 5, solid lines show the distribution of the degree of circularity of the powder particles which have been heat-treated in the heat treatment apparatus according to the present invention, and dashed lines show the distribution of the degree of circularity of the powder particles which have been heat-treated in the conventional heat treatment apparatus. In addition, a solid line also shows the distribution of a degree of circularity of the powder particles (raw material) before being heat-treated. When the powder particles are heat-treated by using the conventional heat treatment apparatus so that the powder particles after having been heat-treated acquire an average degree of circularity of 0.970, the existence frequency of the particles with the degree of circularity of 0.990 or more becomes extremely high, and the value of the average degree of circularity is greatly different from the degree of circularity showing the peak in the distribution of the degree of circularity.

On the other hand, when the powder particles are heat-treated by using the heat treatment apparatus according to the present invention so that the powder particles after having been heat-treated acquire an average degree of circularity of 0.970, the existence frequency of the particles with the degree of circularity of 0.990 or more becomes comparatively low, and the degree of circularity at the peak in the distribution of the degree of circularity is not distant from the value of the average degree of circularity. In addition, even when the average degree of circularity of the powder particles after having been heat-treated has been controlled to 0.955, a ratio of powder particles having a low degree of circularity (in other words, untreated powder particles) is small in the distribution of the degree of circularity, and the powder particles are heat-treated in a nearly uniform state.

Figure 6:
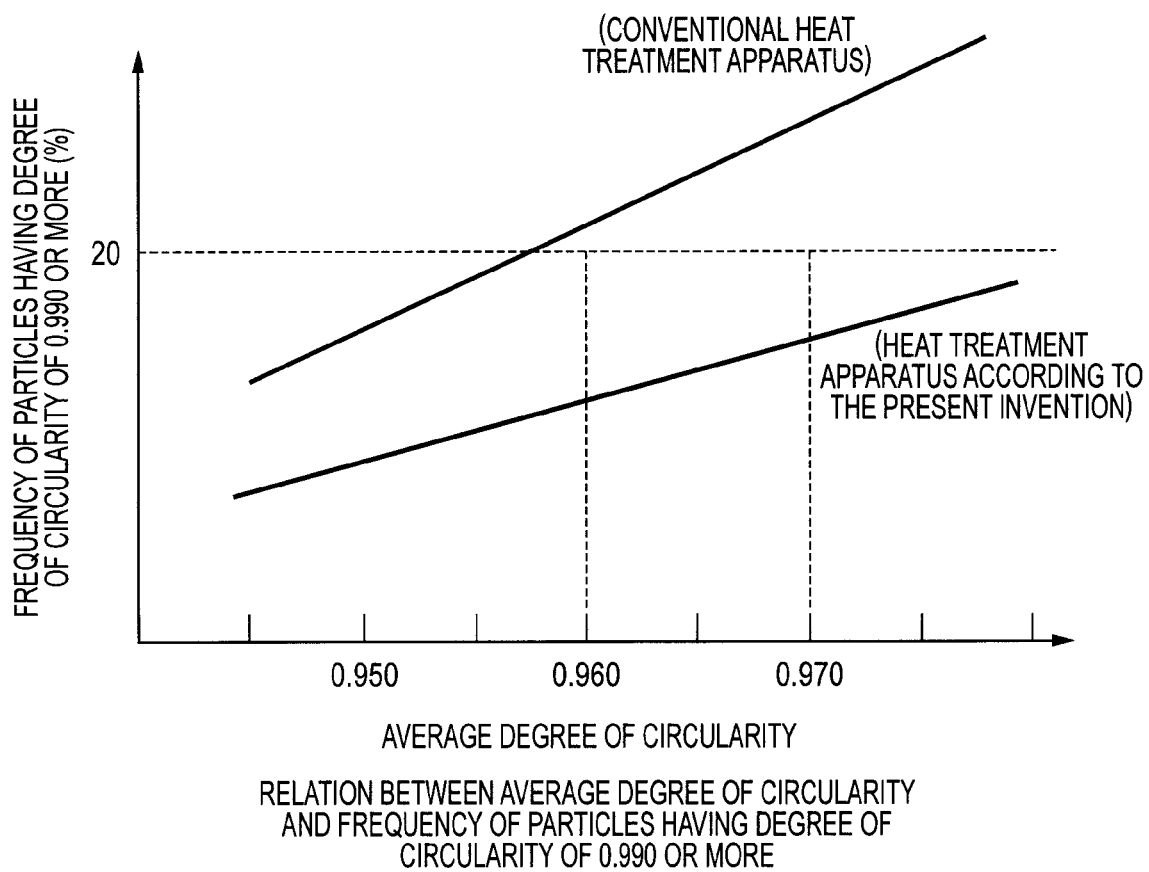
FIG. 6 is a view illustrating a relationship between an average degree of circularity and a frequency of particles with a degree of circularity of 0.990 or more.

FIG. 6 illustrates how the frequency of the particles with the degree of circularity of 0.990 or more in the distribution of the degree of circularity varies with respect to the average degree of circularity.

When the particles are heat-treated in the apparatus according to the present invention, the frequency of the particles with a degree of circularity of 0.990 or more is low in any average degree of circularity, compared to the case in which the particles are heat-treated in the conventional apparatus. In addition, the increase ratio of the frequency of the particles with a degree of circularity of 0.990 or more is also small when the average degree of circularity of the toner has been increased.

One example of a procedure of manufacturing a toner will be described below. Firstly, powder particles are obtained by a raw-material mixing operation of mixing a binder resin, a colorant and a wax which are toner materials, and an arbitrary material, a melting and kneading operation of melting and kneading the toner material to obtain a colored resin composition, a cooling operation of cooling the colored resin composition, and a pulverizing operation of pulverizing the colored resin composition. Then, a toner is obtained by a heat treatment operation of treating the powder particles with the above described heat treatment apparatus, and a classification operation of classifying the powder particles after having been heat-treated and an external addition operation of externally mixing an external additive with the toner particles, as needed.

Each operation will be specifically described below. In the raw-material mixing operation, predetermined amounts of the binder resin, the colorant, the wax and the like are weighed as toner materials, and are mixed. Mixing devices include a double cone mixer, a V type mixer, a drum type mixer, a super mixer, a Henschel mixer and a Nauta mixer, which are one example.

Then, by the operation of melting and kneading the above described toner material, resins are melted, and the colorant and the like are dispersed in the resin. In the melting and kneading operation, for instance, a batch type of a kneading machine such as a pressurizing kneader and a Banbury mixer, and a continuous type of a kneading machine can be used. In recent years, a single or a twin-screw extruder has been in the main stream because of having an advantage of being capable of continuously producing the mixture; and twin-screw extruders to be generally used include, for instance, a KTK type twin-screw extruder made by Kobe Steel, Ltd., a TEM type twin-screw extruder made by TOSHIBA MACHINE CO., LTD., a twin-screw extruder made by KCK Co., Ltd., and a co-kneader made by Buss, Inc. Furthermore, the colored resin composition obtained by melting and kneading the toner material is rolled by two rolls and the like after the melting and kneading operation, and is cooled through a cooling operation of cooling the composition with a water cooling technique or the like.

Subsequently, a cooled substance of the colored resin composition is pulverized down to a desired particle diameter. In the pulverizing operation, firstly, the cooled substance is roughly pulverized by a crusher, a hammer mill, a feather mill or the like, and is finely pulverized by Kryptron System made by Kawasaki Heavy Industries, Ltd., a Super Rotor made by NISSHIN ENGINEERING INC., or the like. Thus obtained powder particles are heat-treated with the above described heat treatment apparatus.

After that, a classified article (toner particle) is obtained by classifying the powder particles after having been heat-treated with a classifier such as Elbow-Jet (made by Nittetsu Mining Co., Ltd.) of an inertial classification type and Turboplex (made by Hosokawa Micron Corporation) of a centrifugal-force classification type, as needed.

Furthermore, an external additive may also be added to the toner particles. The method for externally adding the external additive into the toner particles includes a method of blending a predetermined amount of a known external additive with the toner particles, and stirring/mixing the blended material with the use of a high speed stirrer such as the Henschel mixer and the Super Mixer, which applies a shearing force to the powder.

For information, after the classification operation and the external addition operation for the powder particles have been conducted, a heat treatment operation with the use of the heat treatment apparatus according to the present invention may also be conducted.

A weight average particle diameter (D4) of a toner to be obtained by a method for manufacturing the toner according to the present invention is 4 µm or more but 12 µm or less. When it has been intended to obtain a toner having the weight average particle diameter (D4) of less than 4 µm or a toner having the weight average particle diameter (D4) of more than 12 µm, it is occasionally difficult to balance the treatment amount with the operation condition of the apparatus.

The amount of the wax contained in the toner can be 1 part by mass or more but 10 parts by mass or less with respect to 100 parts by mass of the binder resin. If the amount of the wax contained in the toner is within the above described range, effects (of suppressing coarsening of toner, melt-adhesion of toner to inner part of apparatus, and the like) of the heat treatment apparatus according to the present invention are remarkably shown when having been compared to a conventional heat treatment apparatus.

The method for measuring various physical properties of the above described powder particles or toner particles will be described below.

<Method for Measuring Weight Average Particle Diameter (D4) and Number Average Particle Diameter (D1)>

The weight average particle diameter (D4) and the number average particle diameter (D1) of the toner are measured with channels of 25,000 by the number of an effective measurement channel, while using a precision particle size distribution measurement apparatus provided with an aperture tube of 100 μm with a fine pore electric resistance method "Coulter Counter Multisizer 3" (registered trademark of product made by Beckman Coulter, Inc.), and an attached dedicated software for setting a measuring condition and analyzing a measurement data "Beckman Coulter Multisizer 3 Version 3.51" (made by Beckman Coulter, Inc.), and the measured data is analyzed.

The electrolytic aqueous solution to be used for the measurement can be a solution prepared by dissolving sodium chloride of a special grade reagent into an ion-exchange water so that the concentration becomes approximately 1 mass %, and is, for instance, "ISOTON II" (made by Beckman Coulter, Inc.).

In addition, before measurement and analysis, a dedicated software is set as follows.

In a "screen of changing a standard measurement method (SOM)" of the dedicated software, a total count number of a control mode is set at 50,000 particles, the number of measurement times is set at one time, and a Kd value is set at a value obtained by using "standard particles of 10.0 μm" (made by Beckman Coulter, Inc.). By pressing a measurement button of a threshold/noise level, the threshold/noise level is automatically set. In addition, a current is set at 1,600 μA, a gain is set at 2, an electrolytic solution is set at ISOTON II, and a checkmark is placed on a flush of an aperture tube after having been measured.

In a "screen for setting conversion from pulse to particle diameter" of the dedicated software, the space between bins is set at a logarithm particle diameter, a particle diameter bin is set at 256 particle diameter bins, and a particle diameter range is set in a range of 2 μm to 60 μm.

Specific measurement method is as follows.

(1) Approximately 200 ml of the above described electrolytic aqueous solution is charged into a 250 ml round-bottom glass beaker dedicated to Multisizer 3, the resultant beaker is set in a sample stand, and the electrolytic aqueous solution is stirred counterclockwise with a stirrer rod at 24 revolutions per second. Dirt and air bubbles in the aperture tube are removed beforehand, by a "flush of aperture" function of an analysis software.

(2) Approximately 30 ml of the above described electrolytic aqueous solution is charged into a 100 ml flat-bottom glass beaker, and approximately 0.3 ml of a dilute solution of a dispersing agent is added into the electrolytic aqueous solution, which has been prepared by diluting "Contaminon N" (made by Wako Pure Chemical Industries, Ltd., aqueous solution containing 10 mass % of neutral detergent of pH 7 for cleaning precision measurement instrument, which is formed of nonionic surface active agent, anionic surface active agent and organic builder) with an ion-exchange water into 3 mass times.

(3) A predetermined amount of an ion-exchange water is charged into a water tank of an ultrasonic dispersion apparatus "Ultrasonic Dispersion System Tetora150" (made by the Nikkaki Bios Co., Ltd.), which has two oscillators with an oscillating frequency of 50 kHz built-in in such a state that the phases are displaced from each other by 180 degrees, and has an electrical output of 120 W; and approximately 2 ml of the above described Contaminon N is added into this water tank.

(4) The beaker described in the above (2) is set on a beaker-fixing hole of the above described ultrasonic dispersion apparatus, and the ultrasonic dispersion apparatus is operated. The height position of the beaker is adjusted so that the resonance state of the liquid face of the electrolytic aqueous solution in the beaker becomes maximum.

(5) Approximately 10 mg of a toner is added and dispersed into the above described electrolytic aqueous solution in small quantities, in such a state that the electrolytic aqueous solution in the beaker described in the above (4) is irradiated with the ultrasonic wave. Then, the ultrasonic dispersion treatment is continued for further 60 seconds. For information, in the ultrasonic dispersion treatment, the water temperature in the water tank is appropriately adjusted to 10° C. or higher but 40° C. or lower.

(6) The electrolytic aqueous solution described in the above (5), in which the toner has been dispersed therein, is added dropwise into the round-bottom beaker described in the above (1), which is provided in the sample stand, by using a pipette, and is adjusted so that the measured concentration becomes approximately 5%. Thus, the measurement is conducted until the number of the measured particles reaches 50,000 particles.

(7) The measurement data is analyzed with the above described dedicated software attached to the apparatus, and a weight average particle diameter (D4) and a number average particle diameter (D1) are calculated. For information, the weight average particle diameter (D4) is an "average radius" in a screen of an analysis/volume statistic value (arithmetic average) appearing when graph/volume % is set in the dedicated software, and the number average particle diameter (D1) is an "average radius" in a screen of an analysis/number statistic value (arithmetic average) appearing when graph/number % is set in the dedicated software.

<Method for Calculating Amount of Fine Powder>

The amount (number %) of fine powders based on the number in a toner is calculated as follows.

The number % of the particles of 4.0 μm or less in the toner is determined by: (1) setting the display at graph/number % in the dedicated software, after having measured the diameters with the above described Multisizer 3, and setting the measurement chart at the indication of number %; (2) placing a mark of "<" in a particle-diameter-setting portion in a screen of form/particle diameter/particle diameter statistics, and inputting "4" in a particle-diameter input section under the particle-diameter-setting portion; and (3) making a screen of an analysis/number statistic value (arithmetic average) display a numerical value in a "<4 μm" display section, which is the number % of the particles of 4.0 μm or less in the toner.

<Method for Calculating Amount of Coarse Powder>

The amount (volume %) of coarse powders based on the volume in the toner is calculated as follows.

The volume % of the particles with a particle diameter of 10.0 μm or more, for instance, in the toner is determined by: (1) setting the display at graph/volume % in the dedicated software, after having measured the diameters with the above described Multisizer 3, and setting the measurement chart at the indication of volume %; (2) placing a mark of ">" in a particle-diameter-setting portion in a screen of form/particle diameter/particle diameter statistics, and inputting "10" in a particle-diameter input section under the particle-diameter-setting portion; and (3) making a screen of an analysis/volume statistic value (arithmetic average) display a numerical value in a ">10 μm" display section, which is the volume % of the particles with a particle diameter of 10.0 μm or more in the toner.

<Measurement of Average Degree of Circularity of Toner Particles>

The average degree of circularity of the toner particles is measured with a flow type particle-image analyzer "FPIA- 3000type" (made by SYSMEX CORPORATION) on measurement/analysis conditions in a calibration operation.

Specific measurement method includes: adding an appropriate amount of a surface active agent which is a dispersing agent and can be alkylbenzene sulfonate, into 20 ml of an ion-exchange water; then adding 0.02 g of a measurement sample into the resultant solution; subjecting the resultant liquid to dispersion treatment by using a desktop type of an ultrasonic cleaner dispersing apparatus with an oscillator frequency of 50 kHz and an electrical output of 150 W (for instance, "VS-150" (made by VELVO-CLEAR) or the like) for 2 minutes; and using the resultant liquid as a dispersion liquid for measurement. At this time, the dispersion liquid is appropriately cooled so that the temperature of the dispersion liquid is in a range between 10° C. or higher and 40° C. or lower.

The above described flow type particle-image analyzer loaded with a standard object lens (10 times) is used for measurement, and particle sheath "PSE-900A" (made by SYSMEX CORPORATION) is used as a sheath liquid. The dispersion liquid which has been adjusted according to the above described procedure is introduced into the above described flow type particle-image analyzer, and 3,000 toner particles are measured in a total count mode in a HPF measurement mode. A binarization threshold when the particles are analyzed is set at 85%, the analysis particle diameter is limited to a circle equivalent diameter of 2.00 μm or more but 200.00 μm or less, and the average degree of circularity of the toner particles is determined.

Before starting the measurement, automatic focus adjustment is conducted by using standard latex particles (for instance, 5200A made by Duke Scientific Corporation diluted with ion-exchange water). After that, the automatic focus adjustment can be conducted every 2 hours after the measurement has started.

In the present exemplary embodiment, the average degree of circularity was measured by using the flow type particle-image analyzer which was calibrated by SYSMEX CORPORATION and of which the certificate had been issued by SYSMEX CORPORATION, on measurement and analysis conditions when the certificate had been issued, except that the analysis particle diameter was limited to a circle equivalent diameter of 2.00 μm or more but 200.00 μm or less.

<Measurement of Molecular Weight (Main Peak) by GPC>

The molecular weight based on a chromatogram due to gel permeation chromatograph (GPC) is measured on the following conditions.

The molecular weight is measured by stabilizing a column in a heat chamber at 40° C., passing tetrahydrofuran (THF) as a solvent in the column at 40° C. at a flow rate of 1 ml/minute, and charging 100 μm of a THF sample solution of a resin of which the sample concentration has been adjusted to 0.5 mass %, into the column. An RI (refractive index) detector is used as a detector. It is acceptable to combine a plurality of commercial polystyrene gel columns to each other as the column, in order to accurately measure a molecular weight in a region of $10^3$ to $2 \times 10^6$. There can be combinations, for instance, among μ-styragel 500, 103, 104 and 105 made by Waters Corporation, and among shodex KA-801, 802, 803, 804, 805, 806 and 807 made by Showa Denko K.K.

The molecular weight of the sample is measured by calculating the distribution of the molecular weight of the sample from a relation between a logarithmic value in a calibration curve produced by several types of monodisperse polystyrene standard sample and a count number. Standard polystyrene samples to be used for preparing the calibration curve include, for instance, samples having molecular weights of $6 \times 10^2$, $2.1 \times 10^3$, $4 \times 10^3$, $1.75 \times 10^4$, $5.1 \times 10^4$, $1.1 \times 10^5$, $3.9 \times 10^5$, $8.6 \times 10^5$, $2 \times 10^6$ and $4.48 \times 10^6$ made by Pressure Chemical Company or TOSOH Co., Ltd. It is suitable to use at least approximately 10 standard polystyrene samples.

Example

The present invention will now be described more specifically below with reference to exemplary embodiments and comparative examples, but the present invention is not limited to these exemplary embodiments.

[Manufacture of Polyester Resin 1]

The following materials were weighed in a reaction tank provided with a cooling pipe, a stirrer and a nitrogen introduction pipe.

| | |
|---|---|
| Terephthalic acid | 17.5 parts by mass |
| Polyoxyethylene (2.2)-2,2-bis(4-hydroxyphenyl)propane | 76.3 parts by mass |
| Titanium dihydroxy bis(triethanol aminate) | 0.2 parts by mass |

After that, the materials were reacted for 8 hours while being heated at 220° C., and while nitrogen was introduced into the materials and the produced water was removed from the reactant. After that, a polyester resin 1 was synthesized by adding 1.5 parts by mass of trimellitic anhydride into the reactant, heating the mixture at 180° C., and reacting the reactant with trimellitic anhydride for 4 hours.

As for the molecular weight of the polyester resin 1 obtained by GPC, a weight average molecular weight (Mw) was 82,000, a number average molecular weight (Mn) was 3,400, and a peak molecular weight (Mp) was 8,200. In addition, a glass transition temperature (Tg) was 63° C. and a softening temperature (½ technique) was 110° C.

(Manufacture of Powder Particles)

| | |
|---|---|
| Polyester resin 1 | 100 parts by mass |
| Paraffin Wax (peak temperature of 78° C. at the maximum endothermic peak) | 5 parts by mass |
| Aluminum compound of 3,5-di-t-butylsalicylic acid | 1.0 parts by mass |
| C.I. pigment blue 15:3 | 5 parts by mass |

The above described prescribed materials were mixed with a Henschel mixer (FM-75 type, made by Mitsui Miike Chemical Engineering Machinery, Co., Ltd.), and then were kneaded with a biaxial kneader (PCM-30 type, made by Ikegai Corp), of which the temperature was set at 120° C. The obtained kneaded material was cooled, and was coarsely pulverized into 1 mm or less by a hammer mill. Thus, a coarsely-pulverized substance was obtained. The obtained coarsely-pulverized resin was pulverized with a mechanical pulverizer (T-250, made by Turbo Kogyo Co., Ltd.), and powder particles were obtained.

The obtained powder particles were further classified with a multidivisional classifier which uses a Coanda effect. At this time, the conditions of the classifier was adjusted so that in the powder particles after having been classified, a weight average particle diameter (D4) became 6.2 μm or more but 6.8 μm or less, the powder particles with a particle diameter of 4.0 μm or less became 20 number % or more but 35 number % or less, and the powder particles with the particle diameter of 10.0 μm or more became 1.0 volume % or less.

As for the obtained powder particles, the weight average particle diameter (D4) was 6.2 μm, the powder particles with the particle diameter of 4.0 μm or less were 26.7 number %, and the powder particles with the particle diameter of 10.0 μm or more were 0.2 volume %. Furthermore, as a result of having measured the degree of circularity with the FPIA3000, the average degree of circularity was 0.940. These powder particles are hereafter referred to as powder particles A.

Example 1

Powder particles were heat-treated with the use of a heat treatment apparatus illustrated in FIGS. 1A to 1C.

In the apparatus used in the present exemplary embodiment, a hot-air supply unit and a first nozzle were integrally formed. A louver was provided between a first nozzle and a second nozzle in the outlet portion of the hot-air supply unit so that thereby hot air flowed while spirally rotating along the inner wall face of the apparatus. Furthermore, in the cross-section of the apparatus, an angle formed by the ridge line of the first nozzle (angle spreading toward the downstream side from the upstream side of the apparatus) was set at 40 degrees, an angle formed by the ridge line of the second nozzle was set at 60 degrees, and a return portion was provided on the lower end of the second nozzle. An angle formed by the ridge line of the return portion was set at 140 degrees.

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot-air (T1)=160° C., the quantity of hot-air (Q1)=10.0 m³/min, the total quantity of cold-air 1 (Q2)=4.0 m³/min, the total quantity of cold-air 2 (Q3)=4.0 m³/min, the quantity of a compression gas (IJ)=1.4 m³/min, the air quantity of a blower (Q4)=21.0 m³/min, and the operation period of time was set at 1 hour.

These operation conditions were summarized in Table 1.

As for the heat-treated powder particles which were obtained at this time, the weight average particle diameter was 6.3 μm, the ratio of the powder particles with a particle diameter of 4.0 μm or less in the particle size distribution was 26.1 number %, and the ratio of the powder particles with the particle diameter of 10.0 μm or more was 1.9 volume %. Furthermore, the frequency of the particles with a degree of circularity of 0.990 or more in the distribution of the degree of circularity was 14.2%.

Next, the feed amount (F) was changed to 40 kg/hr, and the powder particles A were heat-treated without changing other operation conditions. As for the heat-treated powder particles which were obtained at this time, the weight average particle diameter was 6.4 μm, the ratio of the powder particles with a particle diameter of 4.0 μm or less in the particle size distribution was 25.8 number %, and the ratio of the powder particles with the particle diameter of 10.0 μm or more was 4.2 volume %. In addition, the average degree of circularity was 0.964.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot-air (T1)=155° C., the quantity of hot-air (Q1)=7.0 m³/min, the total quantity of cold-air 1 (Q2)=4.0 m³/min, the total quantity of cold-air 2 (Q3)=4.0 m³/min, the quantity of the compression gas (IJ)= 1.4 m³/min, the air quantity of the blower (Q4)=18.0 m³/min, and the operation period of time was set at 1 hour.

As for the heat-treated powder particles which were obtained at this time, the weight average particle diameter was 6.2 μm, the ratio of the powder particles with a particle diameter of 4.0 μm or less in the particle size distribution was 26.3 number %, and the ratio of the powder particles with the particle diameter of 10.0 μm or more was 0.4 volume %. Furthermore, the frequency of the particles with a degree of circularity of 0.940 or less in the distribution of the degree of circularity was 10.6%.

The heat-treated powder particles which were obtained on the respective heat treatment conditions were evaluated according to the following criteria.

(Evaluation Criteria 1)

The frequency of the particles was evaluated which had the degree of circularity of 0.990 or more in the distribution of the degree of circularity of the heat-treated powder particles when the feed amount was set at 40 kg/hr and the average degree of circularity was set at 0.970.

A: Frequency of particles with a degree of circularity of 0.990 or more in the distribution of the degree of circularity is less than 20%.

B: Frequency of particles with a degree of circularity of 0.990 or more in the distribution of the degree of circularity is 20% or more.

(Evaluation Criteria 2)

The increase rate (volume %) of powder particles with a particle diameter of 10.0 μm or more when a treatment amount was increased was evaluated according to the expression expressed by the following expression. "Increase rate (volume %) of powder particles with a particle diameter of 10.0 μm or more"="Ratio (volume %) of heat-treated powder particles with a particle diameter of 10.0 μm or more when the feed amount has been set at 40 kg/hr and the average degree of circularity has been set at 0.970"—"Ratio (volume %) of particles of heat-treated powder particles with a particle diameter of 10.0 μm or more when the feed amount has been set at 15 kg/hr and the average degree of circularity has been set at 0.970"

A: Increase rate of powder particles with a particle diameter of 10.0 μm or more is 0 (volume %) or more but less than 3.0 (volume %).

B: Increase rate of powder particles with a particle diameter of 10.0 μm or more is 3.0 (volume %) or more but less than 5.0 (volume %).

C: Increase rate of powder particles with a particle diameter of 10.0 μm or more is 5.0 (volume %) or more but less than 10.0 (volume %).

D: Increase rate of powder particles with a particle diameter of 10.0 μm or more is 10.0 (volume %) or more but less than 15.0 (volume %).

E: Increase rate of powder particles with a particle diameter of 10.0 μm or more is 15.0 (volume %) or more.

(Evaluation Criteria 3)

In the distribution of the degree of circularity of the heat-treated powder particles obtained when the average degree of circularity was set at 0.955, the ratio of the particles with the degree of circularity of 0.940 or less, which was the average degree of circularity of the powder particles A, was expressed by Ha. Ha of Exemplary Embodiment 1 was determined, was compared to Ha in Comparative Examples 1 to 3 which would be described later, and was evaluated by Z expressed by the following expression. In addition, values of Z were determined for Comparative Examples 1 to 3, respectively.

$Z = Ha$ of Exemplary Embodiment/$Ha$ of Comparative Example

A: Z<1.0

B: Z≥1.0

(Evaluation Criteria 4)

The presence or absence of melt-adhesion in the apparatus was evaluated.

A: The melt-adhesion in the apparatus did not occur.
B: The melt-adhesion in the apparatus occurred.

As a result of the above described evaluation, in Exemplary Embodiment 1, the increase of the particles with a particle diameter of 10.0 µm or more was suppressed even when the feed amount was increased. In addition, even when the particles were heat-treated in such a state that the average degree of circularity was set at 0.970, the frequency of the particles of 0.990 or more was suppressed. These results were summarized in Table 2.

Example 2

Figure 2:
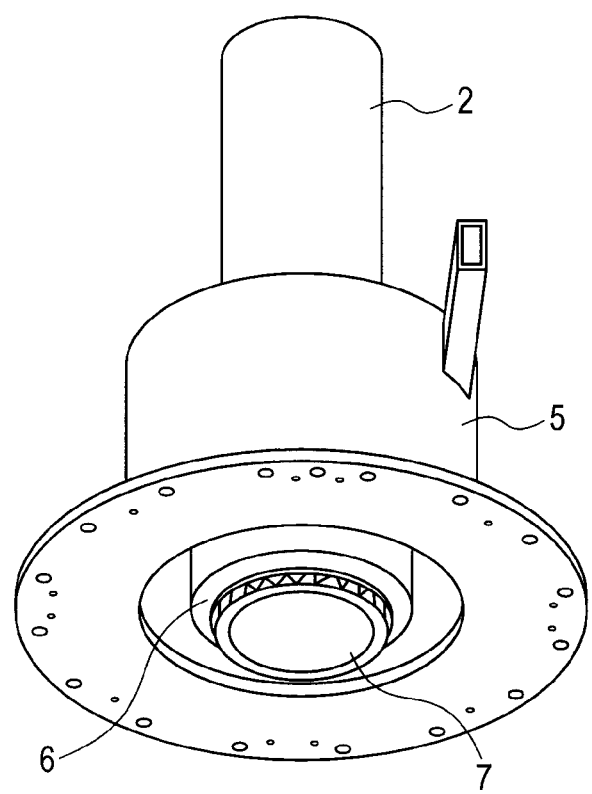
FIG. 2 is a schematic view of a heat treatment apparatus used in Exemplary Embodiment 2.

Powder particles A were heat-treated with the use of an apparatus illustrated in FIG. 2. The apparatus used in the present exemplary embodiment had such a structure that an adjustment portion of a raw-material supply unit was removed from the apparatus used in the Exemplary Embodiment 1.

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot-air (T1)=160° C., the quantity of hot-air (Q1)=10.0 m³/min, the total quantity of cold-air 1 (Q2)=4.0 m³/min, the total quantity of cold-air 2 (Q3)=4.0 m³/min, the quantity of a compression gas (IJ)=1.5 m³/min, the air quantity of a blower (Q4)=21.5 m³/min, and the operation period of time was set at 1 hour.

These operation conditions were summarized in Table 1.

As for the heat-treated powder particles which were obtained at this time, the weight average particle diameter was 6.3 µm, the ratio of the powder particles with a particle diameter of 4.0 µm or less in the particle size distribution was 26.2 number %, and the ratio of the powder particles with the particle diameter of 10.0 µm or more was 1.8 volume %. Furthermore, the frequency of the particles with a degree of circularity of 0.990 or more in the distribution of the degree of circularity was 15.8%.

Next, the feed amount (F) was changed to 40 kg/hr, and the powder particles A were heat-treated without changing other operation conditions. As for the heat-treated powder particles which were obtained at this time, the weight average particle diameter was 6.4 µm, the ratio of the powder particles with a particle diameter of 4.0 µm or less in the particle size distribution was 25.9 number %, and the ratio of the powder particles with the particle diameter of 10.0 µm or more was 3.9 volume %. In addition, the average degree of circularity was 0.965.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot-air (T1)=155° C., the quantity of hot-air (Q1)=7.0 m³/min, the total quantity of cold-air 1 (Q2)=4.0 m³/min, the total quantity of cold-air 2 (Q3)=4.0 m³/min, the quantity of the compression gas (IJ)= 1.5 m³/min, the air quantity of the blower (Q4)=18.0 m³/min, and the operation period of time was set at 1 hour.

As for the heat-treated powder particles which were obtained at this time, the weight average particle diameter was 6.2 µm, the ratio of the powder particles with a particle diameter of 4.0 µm or less in the particle size distribution was 26.3 number %, and the ratio of the powder particles with the particle diameter of 10.0 µm or more was 0.5 volume %. Furthermore, the frequency of the particles with a degree of circularity of 0.940 or less in the distribution of the degree of circularity was 11.2%.

Example 3

Figure 3:
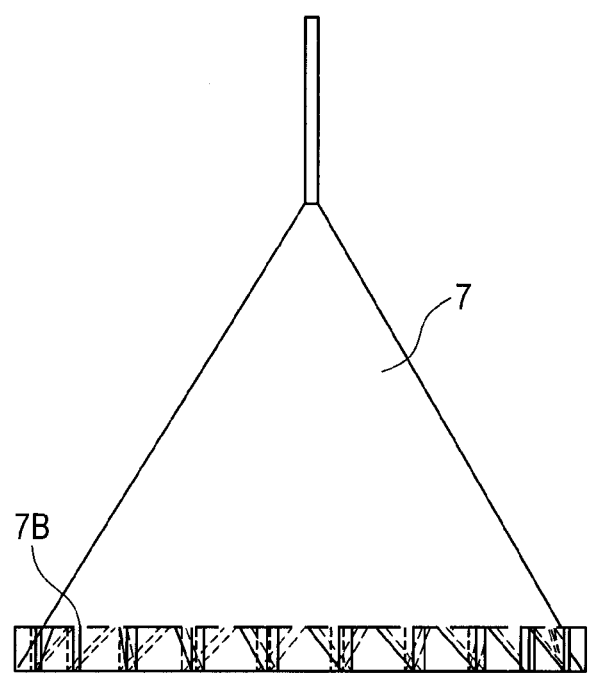
FIG. 3 is a schematic view of a nozzle of a heat treatment apparatus used in Exemplary Embodiment 3.

The apparatus used in the present exemplary embodiment was provided with a second nozzle having a shape (having ribs provided in the end of the nozzle and having no return portion) illustrated in FIG. 3. The apparatus had the same structure as the apparatus used in Exemplary Embodiment 1, except the above point.

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot-air (T1)=170° C., the quantity of hot-air (Q1)=10.0 m³/min, the total quantity of cold-air 1 (Q2)=4.0 m³/min, the total quantity of cold-air 2 (Q3)=4.0 m³/min, the quantity of a compression gas (IJ)=1.4 m³/min and the air quantity of a blower (Q4)=21.0 m³/min, and the operation period of time was set at 1 hour.

These operation conditions were summarized in Table 1.

As for the heat-treated powder particles which were obtained at this time, the weight average particle diameter was 6.3 µm, the ratio of the powder particles with a particle diameter of 4.0 µm or less in the particle size distribution was 26.2 number %, and the ratio of the powder particles with a particle diameter of 10.0 µm or more was 1.6 volume %. Furthermore, the frequency of the particles with a degree of circularity of 0.990 or more in the distribution of the degree of circularity was 16.4%.

Next, the feed amount (F) was changed into 40 kg/hr, and the powder particles A were heat-treated without changing other operation conditions. As for the heat-treated powder particles which were obtained at this time, the weight average particle diameter was 6.5 µm, the ratio of the powder particles with a particle diameter of 4.0 µm or less in the particle size distribution was 25.3 number %, and the ratio of the powder particles with a particle diameter of 10.0 µm or more was 4.8 volume %. In addition, the average degree of circularity was 0.965.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot-air (T1)=155° C., the quantity of hot-air (Q1)=8.0 m³/min, the total quantity of cold-air 1 (Q2)=4.0 m³/min, the total quantity of cold-air 2 (Q3)=2.0 m³/min, the quantity of the compression gas (IJ)= 1.4 m³/min and the air quantity of the blower (Q4)=19.0 m³/min, and the operation period of time was set at 1 hour.

As for the heat-treated powder particles which were obtained at this time, the weight average particle diameter was 6.3 µm, the ratio of the powder particles with a particle diameter of 4.0 µm or less in the particle size distribution was 25.8 number %, and the ratio of the powder particles with a particle diameter of 10.0 µm or more was 0.6 volume %. Furthermore, the frequency of the particles with a degree of circularity of 0.940 or less in the distribution of the degree of circularity was 11.8%.

Example 4

Figure 4:
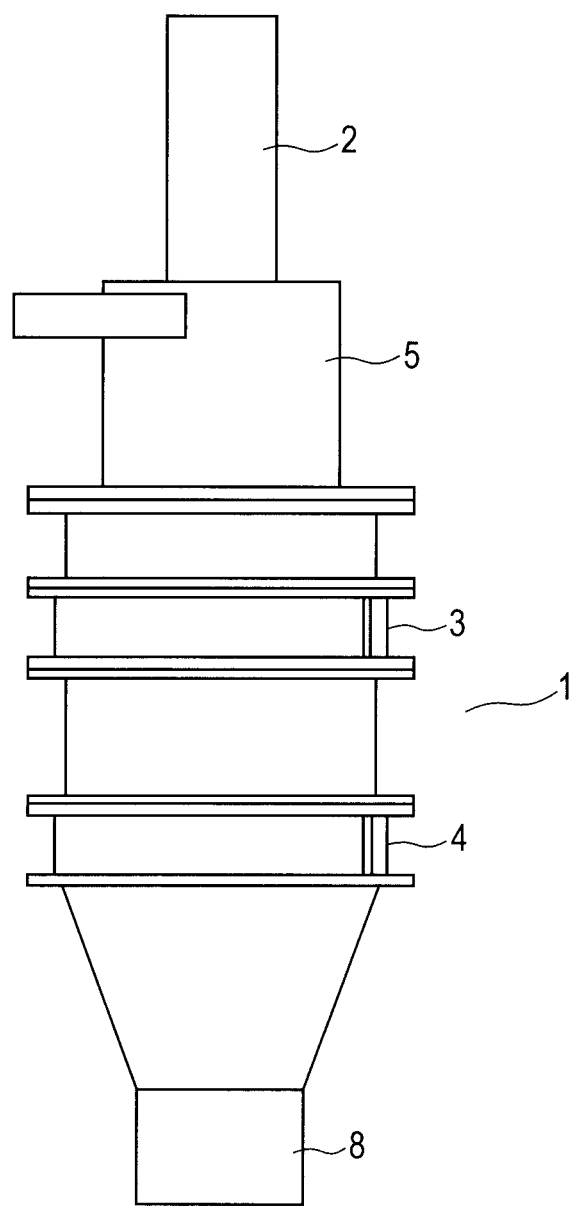
FIG. 4 is a schematic view of a heat treatment apparatus used in Exemplary Embodiment 4.

Powder particles were heat-treated with the use of an apparatus illustrated in FIG. 4. In the apparatus according to the present exemplary embodiment, a discharge portion was directed at the lower part of the apparatus, and except this point, the apparatus had the same structure as the apparatus used in Exemplary Embodiment 1.

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot-air (T1)=170° C., the quantity of hot-air (Q1)=10.0 m$^3$/min, the total quantity of cold-air 1 (Q2)=4.0 m$^3$/min, the total quantity of cold-air 2 (Q3)=4.0 m$^3$/min, the quantity of a compression gas (IJ)=1.6 m$^3$/min and the air quantity of a blower (Q4)=22.0 m$^3$/min, and the operation period of time was set at 1 hour.

These operation conditions were summarized in Table 1.

As for the heat-treated powder particles which were obtained at this time, the weight average particle diameter was 6.3 μm, the ratio of the powder particles with a particle diameter of 4.0 μm or less in the particle size distribution was 25.9 number %, and the ratio of the powder particles with a particle diameter of 10.0 μm or more was 2.2 volume %. Furthermore, the frequency of the particles with a degree of circularity of 0.990 or more in the distribution of the degree of circularity was 16.1%.

Next, the feed amount (F) was changed into 40 kg/hr, and the powder particles A were heat-treated without changing other operation conditions. As for the heat-treated powder particles which were obtained at this time, the weight average particle diameter was 6.5 μm, the ratio of the powder particles with a particle diameter of 4.0 μm or less in the particle size distribution was 25.4 number %, and the ratio of the powder particles with a particle diameter of 10.0 μm or more was 5.3 volume %. In addition, the average degree of circularity was 0.963.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot-air (T1)=155° C., the total quantity of hot-air (Q1)=8.5 m$^3$/min, the total quantity of cold-air 1 (Q2)=4.0 m$^3$/min, the total quantity of cold-air 2 (Q3)=4.0 m$^3$/min, the quantity of the compression gas (IJ)=1.4 m$^3$/min and the air quantity of the blower (Q4)=20.0 m$^3$/min, and the operation period of time was set at 1 hour.

As for the heat-treated powder particles which were obtained at this time, the weight average particle diameter was 6.3 μm, the ratio of the powder particles with a particle diameter of 4.0 μm or less in the particle size distribution was 26.5 number %, and the ratio of the powder particles with a particle diameter of 10.0 μm or more was 0.8 volume %. Furthermore, the frequency of the particles with a degree of circularity of 0.940 or less in the distribution of the degree of circularity was 12.1%.

Exemplary Embodiments 2, 3 and 4 as well were evaluated in a similar way to that in Exemplary Embodiment 1. The evaluation results are shown in Table 2.

Comparative Example 1

Figure 7:
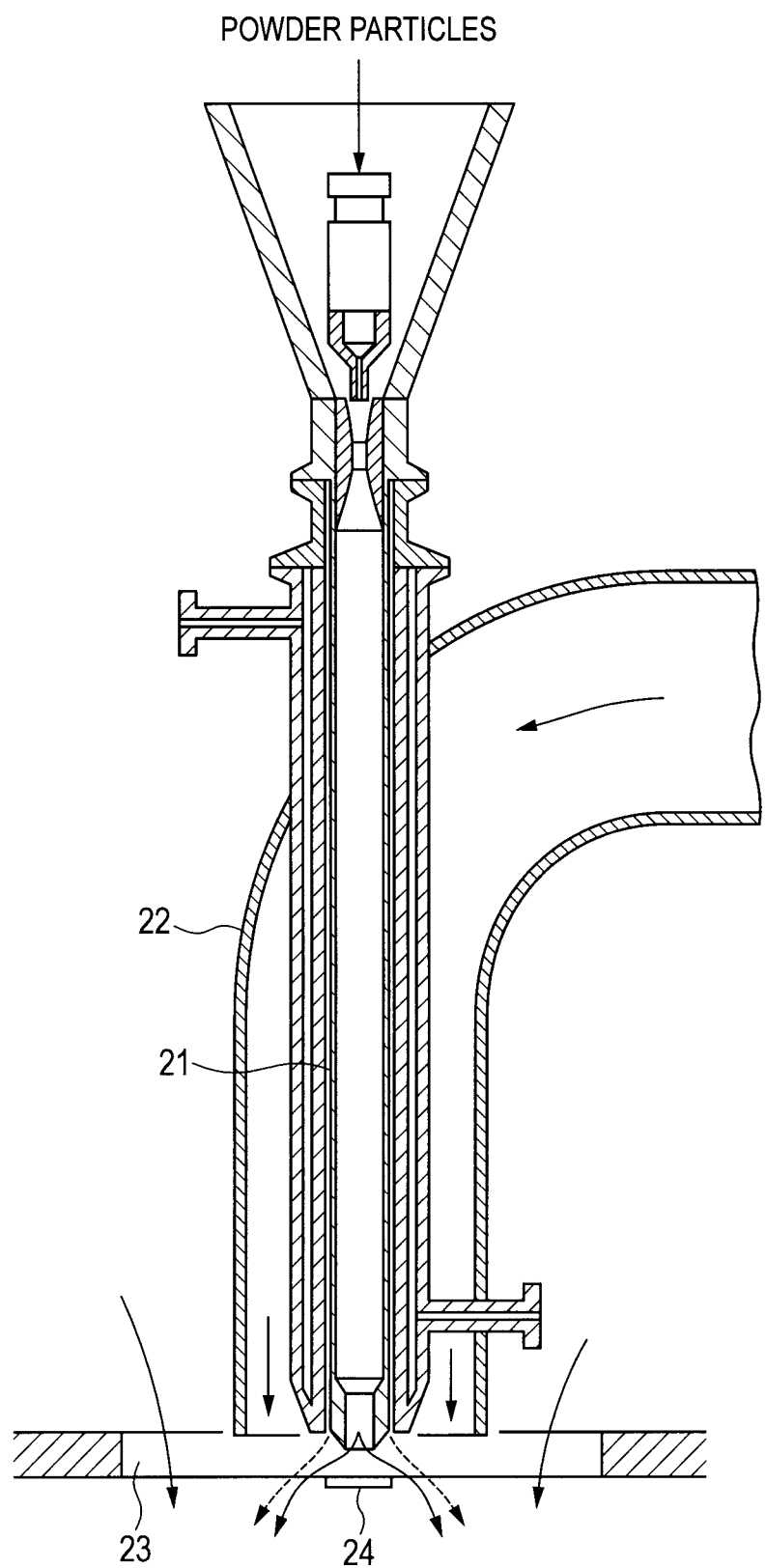
FIG. 7 is a partial sectional view of a heat treatment apparatus used in Comparative Example 1.

In the present comparative example, the powder particles were heat-treated with the use of the apparatus illustrated in FIG. 7. In the apparatus illustrated in FIG. 7, a raw-material supply unit (21 in the figure) is inserted into a hot-air supply unit (22 in the figure), and an outside-air introduction portion (23 in the figure) is provided in the outer circumferential part of the hot-air supply unit. The dispersion plate (24) is provided in the outlet portion of the raw-material supply unit (21), and the powder particles supplied from the raw-material supply unit are dispersed by the dispersion plate. The apparatus illustrated in FIG. 7 does not have an air-flow adjustment unit for rotating hot air in the apparatus provided therein.

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot air=300° C., the quantity of hot air=10.0 m$^3$/min, the quantity of cold air=10.0 m$^3$/min and an injection flow rate=3.0 m$^3$/min, and the operation period of time was set at 1 hour.

As for the heat-treated powder particles which were obtained at this time, the weight average particle diameter was 6.4 μm, the ratio of the powder particles with a particle diameter of 4.0 μm or less in the particle size distribution was 25.2 number %, and the ratio of the powder particles with the particle diameter of 10.0 μm or more was 2.3 volume %. Furthermore, the frequency of the particles with the degree of circularity of 0.990 or more in the distribution of the degree of circularity was 36.3%.

Next, the feed amount (F) was changed to 40 kg/hr, and the powder particles A were heat-treated without changing other operation conditions. As for the heat-treated powder particles which were obtained at this time, the weight average particle diameter was 7.1 μm, the ratio of the powder particles with a particle diameter of 4.0 μm or less in the particle size distribution was 24.1 number %, and the ratio of the powder particles with the particle diameter of 10.0 μm or more was 16.2 volume %. In addition, the average degree of circularity was 0.962.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot air=250° C., the quantity of hot air=10.0 m$^3$/min, the quantity of cold air=10.0 m$^3$/min and the injection flow rate=3.0 m$^3$/min, and the operation period of time was set at 1 hour.

As for the heat-treated powder particles which were obtained at this time, the weight average particle diameter was 6.3 μm, the ratio of the powder particles with a particle diameter of 4.0 μm or less in the particle size distribution was 26.3 number %, and the ratio of the powder particles with the particle diameter of 10.0 μm or more was 1.1 volume %. Furthermore, the frequency of the particles with a degree of circularity of 0.940 or less in the distribution of the degree of circularity was 15.6%.

Furthermore, when the inside of the apparatus was observed after the completion of the heat treatment, the melt-adhesion of the powder particles was observed on the dispersion plate provided in the lower part of a powder-particle supply nozzle. This result suggests that the apparatus requires maintenance in comparative short cycles, and there is a concern in terms of production stability.

The reason why the particles with a particle diameter of 10.0 μm or more increase is considered as follows. In the apparatus illustrated in FIG. 7, the raw-material supply unit (powder-particle supply nozzle) is inserted into the hot air, and the outlet portion of the nozzle retains heat. Because of this, the powder particles fuse in the outlet portion of the nozzle, and coarse particles increase. When the toner containing much wax is heat-treated in particular, the bleeding of the wax increases due to the heat treatment, and the fusion of the toner tends to easily occur.

In addition, when the present comparative example is compared to the exemplary embodiment, the present comparative example is not preferable from the viewpoint of manufacture energy as well, because the quantity of the hot air to be supplied, the quantity of the cold air and the injection flow rate are large, and the temperature of the hot air is also high.

Furthermore, in the distribution of the degree of circularity of the heat-treated powder particles obtained when the average degree of circularity was set at 0.970, the frequency of the particles with the degree of circularity of 0.990 or more is higher than those of the exemplary embodiments. This result originates in that the temperature of the hot air is higher than that of the apparatus having the structure of the exemplary embodiment, and the efficiency is poor when the powder particles are spheroidized. Furthermore, the frequency of the particles with the degree of circularity of 0.940 or less in the distribution of the degree of circularity of the heat-treated powder particles obtained when the average degree of circularity was set at 0.955 is larger than those of the exemplary embodiments. The result also originates in that the efficiency is poor when the powder particles are spheroidized.

Comparative Example 2

Figure 8A:
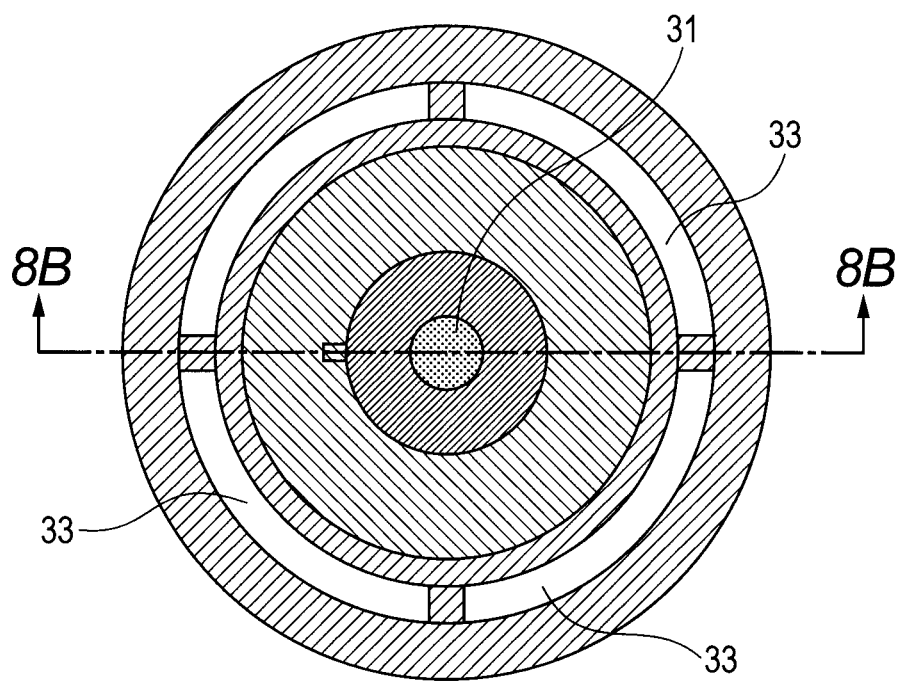
FIGS. 8A and 8B are partial sectional views of a heat treatment apparatus used in Comparative Example 2.
Figure 8B:
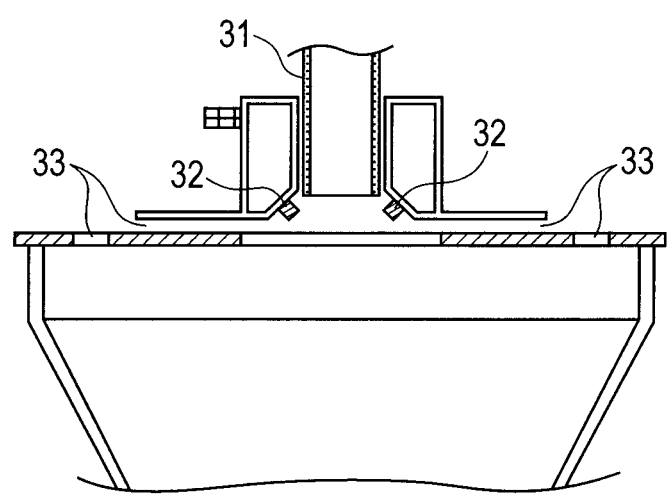

In the present comparative example, the powder particles were heat-treated with the use of the apparatus illustrated in FIGS. 8A and 8B. For information, FIG. 8B illustrates the cross-section taken along the line 8B-8B in FIG. 8A. In the apparatus illustrated in FIGS. 8A and 8B, a hot-air supply unit (31 in the figure) is provided in the axial center part of the apparatus, the raw-material supply unit (32 in the figure) is provided in the outer circumferential part of the hot-air supply unit, and the raw material is injected toward the hot air. An outside-air introduction port (33 in the figure) which is the cold-air supply unit is provided in the downstream side of the hot-air supply unit, and is structured so that the powder particles after having been heat-treated rotate spirally along the wall face in the apparatus. Furthermore, a transportation path in the apparatus and the cold-air supply unit for cooling are provided in the downstream side of the hot-air supply unit (not shown).

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot air=230° C., the quantity of hot air=10.0 m$^3$/min, the quantity of upper cold air=4.0 m$^3$/min, the quantity of lower cold air=8.0 m$^3$/min and the injection flow rate=1.8 m$^3$/min, and the operation period of time was set at 1 hour.

As for the heat-treated powder particles which were obtained at this time, the weight average particle diameter was 6.5 μm, the ratio of the powder particles with a particle diameter of 4.0 μm or less in the particle size distribution was 24.9 number %, and the ratio of the powder particles with a particle diameter of 10.0 μm or more was 3.2 volume %. Furthermore, the frequency of the particles with the degree of circularity of 0.990 or more in the distribution of the degree of circularity was 31.4%.

Next, the feed amount (F) was changed to 40 kg/hr, and the powder particles A were heat-treated without changing other operation conditions. As for the heat-treated powder particles which were obtained at this time, the weight average particle diameter was 7.1 μm, the ratio of the powder particles with a particle diameter of 4.0 μm or less in the particle size distribution was 23.6 number %, and the ratio of the powder particles with a particle diameter of 10.0 μm or more was 14.5 volume %. In addition, the average degree of circularity was 0.962.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot air=200° C., the quantity of hot air=9.0 m$^3$/min, the quantity of upper cold air=4.0 m$^3$/min, the quantity of lower cold air=8.0 m$^3$/min and the injection flow rate=1.7 m$^3$/min, and the operation period of time was set at 1 hour.

As for the heat-treated powder particles which were obtained at this time, the weight average particle diameter was 6.3 μm, the ratio of the powder particles with a particle diameter of 4.0 μm or less in the particle size distribution was 25.8 number %, and the ratio of the powder particles with a particle diameter of 10.0 μm or more was 1.3 volume %. Furthermore, the frequency of the particles with a degree of circularity of 0.940 or less in the distribution of the degree of circularity was 14.5%.

The reason why the particles with a particle diameter of 10.0 μm or more increase is considered as follows. In the apparatus illustrated in FIGS. 8A and 8B, the raw-material supply unit (powder-particle supply nozzle) is directed at the hot air, and accordingly the powder particles which have been injected into the hot air tend to easily collide against each other and fuse. When the toner containing much wax is heat-treated in particular, the bleeding of the wax increases due to the heat treatment, and the fusion of the toner tends to easily occur.

Furthermore, in the distribution of the degree of circularity of the heat-treated powder particles obtained when the average degree of circularity was set at 0.970, the frequency of the particles with the degree of circularity of 0.990 or more is higher than those of the exemplary embodiments. This result originates in that the temperature of the hot air is higher than that of the apparatus having the structure of the exemplary embodiment, and the efficiency is poor when the powder particles are spheroidized. In addition, the powder particles result in riding on the swirling flow after having been heat-treated, and accordingly the classification effect of the powder particles in the heat treatment also cannot be expected.

Furthermore, the frequency of the particles with the degree of circularity of 0.940 or less in the distribution of the degree of circularity of the heat-treated powder particles obtained when the average degree of circularity was set at 0.955 is larger than those of the exemplary embodiments. The result also originates in that the efficiency is poor when the powder particles are spheroidized.

Comparative Example 3

Figure 9:
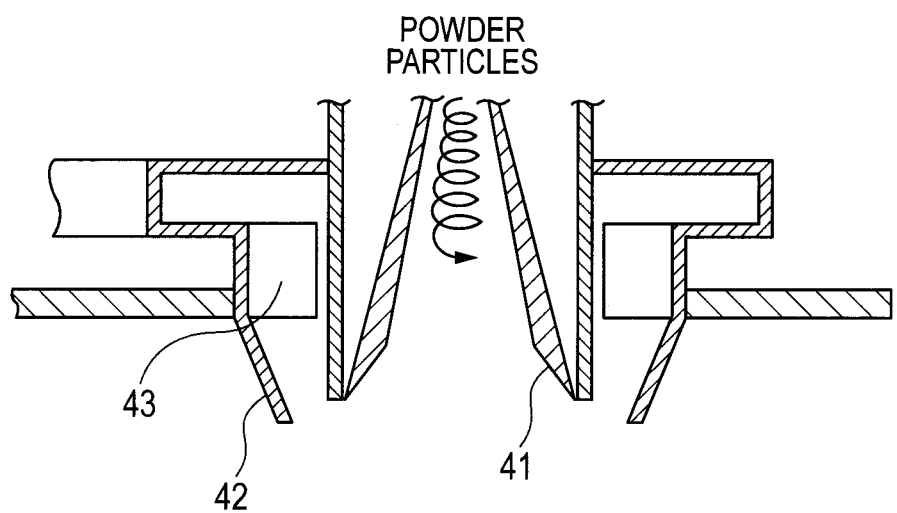
FIG. 9 is a partial sectional view of a heat treatment apparatus used in Comparative Example 3.

In the present comparative example, the powder particles were heat-treated with the use of the apparatus illustrated in FIG. 9. In the apparatus illustrated in FIG. 9, a raw material is charged into the hot air while being rotated in the raw-material supply unit (41 in the figure). In addition, the air-flow adjustment portion (43 in the figure) is provided in the hot-air supply unit (42).

The powder particles A were heat-treated so that the average degree of circularity of the powder particles A after having been heat-treated became 0.970, by using the apparatus having the above described structure.

As for the operation conditions at this time, the feed amount (F)=15 kg/hr, the temperature of hot air=250° C., the quantity of hot air=10.0 m³/min, the quantity of cold air=10.0 m³/min and the injection flow rate=2.5 m³/min, and the operation period of time was set at 1 hour.

As for the heat-treated powder particles which were obtained at this time, the weight average particle diameter was 6.4 μm, the ratio of the powder particles with a particle diameter of 4.0 μm or less in the particle size distribution was 25.9 number %, and the ratio of the powder particles with the particle diameter of 10.0 μm or more was 2.2 volume %. Furthermore, the frequency of the particles with the degree of circularity of 0.990 or more in the distribution of the degree of circularity was 29.8%.

Next, the feed amount (F) was changed to 40 kg/hr, and the powder particles A were heat-treated without changing other operation conditions. As for the heat-treated powder particles which were obtained at this time, the weight average particle diameter was 6.9 μm, the ratio of the powder particles with a particle diameter of 4.0 μm or less in the particle size distribution was 24.6 number %, and the ratio of the powder particles with the particle diameter of 10.0 μm or more was 9.4 volume %. In addition, the average degree of circularity was 0.963.

Next, the powder particles A were heat-treated so that the average degree of circularity of the powder particles A after having been heat-treated became 0.955, by using the apparatus having the above described structure.

As for the operation conditions at this time, the feed amount (F)=15 kg/hr, the temperature of hot air=220° C., the quantity of hot air=10.0 m³/min, the quantity of cold air=10.0 m³/min and the injection flow rate=2.5 m³/min, and the operation period of time was set at 1 hour.

As for the heat-treated powder particles which were obtained at this time, the weight average particle diameter was 6.3 μm, the ratio of the powder particles with a particle diameter of 4.0 μm or less in the particle size distribution was 26.0 number %, and the ratio of the powder particles with a particle diameter of 10.0 μm or more was 0.8 volume %. Furthermore, the frequency of the particles with a degree of circularity of 0.940 or less in the distribution of the degree of circularity was 13.2%.

The reason why the particles with a particle diameter of 10.0 μm or more increase is considered as follows. In the apparatus illustrated in FIG. 9, the raw-material supply unit (powder-particle supply nozzle) is inserted into the hot air, and the outlet portion of the nozzle retains heat. Because of this, the powder particles fuse in the outlet portion of the nozzle, and coarse particles increase. When the toner containing much wax is heat-treated in particular, the bleeding of the wax increases due to the heat treatment, and the fusion of the toner tends to easily occur.

Furthermore, the flow containing the raw material is rotated in the raw-material supply unit, but the effect of dispersing the raw material in the apparatus is actually poor. Because of this, if the quantity and the temperature of the hot air are not increased, it becomes difficult to spheroidize all of the powder particles.

In addition, the direction of the outlet portion of the hot-air supply unit is directed at the axial center part, which results in blocking the spread of the raw material and making the radius of rotation remain small. Accordingly, the effect of dispersing the powder particles by the spiral rotation flow also becomes small.

In addition, when the present comparative example is compared to the exemplary embodiment, the present comparative example is not preferable from the viewpoint of a manufacture energy as well, because the quantity of the hot air to be supplied, the quantity of the cold air and the injection flow rate are large, and the temperature of the hot air is also high.

Furthermore, in the distribution of the degree of circularity of the heat-treated powder particles obtained when the average degree of circularity was set at 0.970, the frequency of the particles with the degree of circularity of 0.990 or more is higher than those of the exemplary embodiments. This result originates in that the temperature of the hot air is higher than that of the apparatus having the structure of the exemplary embodiment, and the efficiency is poor when the powder particles are spheroidized.

Furthermore, the frequency of the particles with the degree of circularity of 0.940 or less in the distribution of the degree of circularity of the heat-treated powder particles obtained when the average degree of circularity was set at 0.955 is larger than those of the exemplary embodiments. The result also originates in that the efficiency is poor when the powder particles are spheroidized.

Comparative Examples 1, 2, and 3 were evaluated in a similar way to that in Exemplary Embodiment 1. The evaluation results are shown in Table 2.

TABLE 1

|  | F (kg/hr) | T1 (° C.) | Q1 (m³/min) | Q2 (m³/min) | Q3 (m³/min) | Q4 (m³/min) | IJ (m³/min) |
|---|---|---|---|---|---|---|---|
| Exemplary Embodiment 1 | 15 | 160 | 10.0 | 4.0 | 4.0 | 21.0 | 1.4 |
|  | 40 |  |  |  |  |  |  |
|  | 15 | 155 | 7.0 | 4.0 | 4.0 | 18.0 | 1.4 |
| Exemplary Embodiment 2 | 15 | 160 | 10.0 | 4.0 | 4.0 | 21.5 | 1.5 |
|  | 40 |  |  |  |  |  |  |
|  | 15 | 155 | 7.0 | 4.0 | 4.0 | 18.0 | 1.5 |
| Exemplary Embodiment 3 | 15 | 170 | 10.0 | 4.0 | 4.0 | 21.0 | 1.4 |
|  | 40 |  |  |  |  |  |  |
|  | 15 | 155 | 8.0 | 4.0 | 4.0 | 19.0 | 1.4 |
| Exemplary Embodiment 4 | 15 | 170 | 10.0 | 4.0 | 4.0 | 22.0 | 1.6 |
|  | 40 |  |  |  |  |  |  |
|  | 15 | 155 | 8.5 | 4.0 | 4.0 | 20.0 | 1.4 |

TABLE 2

| | F (kg/hr) | Weight average diameter (μm) | Particle size distribution 4.0 μm or less (number %) | 10.0 μm or more (volume %) | Average degree of circularity | Frequency of 0.990 or more (%) | Frequency of 0.940 or less (%) | Increase rate of powder particles of 10.0 μm or more |
|---|---|---|---|---|---|---|---|---|
| Raw material | | 6.2 | 26.7 | 0.2 | 0.940 | 1.2 | 41.5 | |
| Exemplary Embodiment 1 | 15 | 6.3 | 26.1 | 1.9 | 0.970 | 14.2 | — | 2.3 |
| | 40 | 6.4 | 25.8 | 4.2 | 0.964 | — | — | |
| | 15 | 6.2 | 26.3 | 0.4 | 0.955 | — | 10.6 | |
| Exemplary Embodiment 2 | 15 | 6.3 | 26.2 | 1.8 | 0.970 | 15.8 | — | 2.1 |
| | 40 | 6.4 | 25.9 | 3.9 | 0.965 | — | — | |
| | 15 | 6.2 | 26.3 | 0.5 | 0.955 | — | 11.2 | |
| Exemplary Embodiment 3 | 15 | 6.3 | 26.2 | 1.6 | 0.970 | 16.4 | — | 3.2 |
| | 40 | 6.5 | 25.3 | 4.8 | 0.965 | — | — | |
| | 15 | 6.3 | 25.8 | 0.6 | 0.955 | — | 11.8 | |
| Exemplary Embodiment 4 | 15 | 6.3 | 25.9 | 2.2 | 0.970 | 16.1 | — | 3.1 |
| | 40 | 6.5 | 25.4 | 5.3 | 0.963 | — | — | |
| | 15 | 6.3 | 26.5 | 0.8 | 0.955 | — | 12.1 | |
| Comparative Example 1 | 15 | 6.4 | 25.2 | 2.3 | 0.970 | 36.3 | — | 13.9 |
| | 40 | 7.1 | 24.1 | 16.2 | 0.962 | — | — | |
| | 15 | 6.3 | 26.3 | 1.1 | 0.955 | — | 15.6 | |
| Comparative Example 2 | 15 | 6.5 | 24.9 | 3.2 | 0.970 | 31.4 | — | 16.5 |
| | 40 | 7.1 | 23.6 | 19.7 | 0.960 | — | — | |
| | 15 | 6.3 | 25.8 | 1.3 | 0.955 | — | 14.5 | |
| Comparative Example 3 | 15 | 6.4 | 25.9 | 2.2 | 0.970 | 29.8 | — | 7.2 |
| | 40 | 6.9 | 24.6 | 9.4 | 0.963 | — | — | |
| | 15 | 6.3 | 26.0 | 0.8 | 0.955 | — | 13.2 | |

TABLE 3

| | Z for Comparative Example 1 | Z for Comparative Example 2 | Z for Comparative Example 3 | Evaluation criteria 1 | Evaluation criteria 2 | Evaluation criteria 3 for Comparative Example 1 | Evaluation criteria 3 for Comparative Example 2 | Evaluation criteria 3 for Comparative Example 3 | Evaluation criteria 4 | Total |
|---|---|---|---|---|---|---|---|---|---|---|
| Exemplary Embodiment 1 | 0.68 | 0.73 | 0.80 | A | A | A | A | A | A | A |
| Exemplary Embodiment 2 | 0.72 | 0.77 | 0.85 | A | A | A | A | A | A | A |
| Exemplary Embodiment 3 | 0.76 | 0.81 | 0.89 | A | B | A | A | A | A | B |
| Exemplary Embodiment 4 | 0.78 | 0.83 | 0.92 | A | B | A | A | A | A | B |
| Comparative Example 1 | | 1.08 | 1.18 | B | D | | B | B | B | D |
| Comparative Example 2 | 0.93 | | 1.10 | B | E | A | | B | A | D |
| Comparative Example 3 | 0.85 | 0.91 | | B | C | A | A | | A | C |

The powder particles (toner particles) obtained by the above described exemplary embodiments are provided as a toner product, after a known external additive has been further added thereto, as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-034251, filed Feb. 21, 2011, which is hereby incorporated by reference herein in its entirety.

REFERENCE SIGNS LIST

1: Main body of heat treatment apparatus,
2: Hot-air supply unit,
2A: Air-flow adjustment unit,
3: Cold-air supply unit 1,
4: Cold-air supply unit 2,
5: Raw-material supply unit,
5A: Adjustment unit,
6: First nozzle,
7: Second nozzle,
7A: Return portion,
7B: Rib,
8: Discharge portion,
21: Raw-material supply unit,
22: Hot-air supply unit,
23: Outside-air introduction portion,
24: Dispersion plate,
31: Hot-air supply unit,
32: Raw-material supply unit,
33: Outside-air introduction port,
41: Raw-material supply unit,
42: Hot-air supply unit,
43: Air-flow adjustment unit

The invention claimed is:

1. A heat treatment apparatus for heat-treating powder particles containing a thermoplastic binder resin, comprising:
   a raw-material supply unit for supplying the powder particles into the apparatus;
   a hot-air supply unit for heat-treating the supplied powder particles; and
   a discharge portion for discharging the heat-treated powder particles, the discharge portion being positioned in a downstream side of the raw-material supply unit and the hot-air supply unit,
   wherein: the raw-material supply unit is circularly provided so as to surround the hot-air supply unit at such a position as to be adjacent to an outer peripheral face of the hot-air supply unit, or at such a position as to be separated from the outer peripheral face in the horizontal direction,
   from an outlet of the hot-air supply unit, hot air is supplied toward the powder particles which are supplied from the raw-material supply unit,
   the hot-air supply unit has a first nozzle and a second nozzle which spread in a radial direction to the downstream side from an upstream side in a hot-air supply direction,
   the second nozzle is arranged in the inside of the first nozzle, and
   the hot air passes through a space between the inside of the first nozzle and the outside of the second nozzle,
   and wherein:
   the heat treatment apparatus further comprises an air-flow adjustment unit for rotating the supplied hot air spirally along an inner wall face of the apparatus, the air-flow adjustment unit being provided in an outlet portion of the hot-air supply unit.

2. The heat treatment apparatus according to claim 1, wherein a return portion which spreads the hot air in the radial direction is provided in a lower part of the second nozzle.

3. The heat treatment apparatus according to claim 1, wherein an adjustment unit is provided for rotating a flow of the powder particles to be supplied to the same direction of the hot air, in an outlet portion of the raw-material supply unit.

4. The heat treatment apparatus according to claim 1, wherein one or more cold-air supply units are provided in the downstream side of the hot-air supply unit and the raw-material supply unit, and in an upstream side of the discharge portion.

5. The heat treatment apparatus according to claim 4, wherein the cold-air supply unit supplies cold air along an inner peripheral face in the apparatus from an outer circumferential part of the apparatus, and in the same direction as the rotation direction of the hot air.

6. The heat treatment apparatus according to claim 1, wherein the discharge portion is provided in an approximately horizontal direction from an outer circumferential part of an inner wall of the apparatus so as to maintain rotation flow of the heat-treated powder particles.

7. A method for manufacturing a toner, comprising obtaining a toner by passing an operation of heat-treating powder particles containing a thermoplastic binder resin and a colorant, wherein
   the toner has a weight average particle diameter of 4 μm or more but 12 μm or less, and
   in the heat treatment operation, the heat treatment apparatus according to claim 1 is used.

* * * * *